(12) United States Patent
Kramer et al.

(10) Patent No.: US 6,751,282 B1
(45) Date of Patent: Jun. 15, 2004

(54) SIGNAL ACTIVE PERCENTAGE MONITOR

(75) Inventors: Paul Joseph Kramer, Fort Collins, CO (US); Jered Michael Sandner, Wellington, CO (US); Ohad Falik, Kfar Saba (IL)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/389,292

(22) Filed: Mar. 13, 2003

(51) Int. Cl.[7] .............................................. G07C 3/00
(52) U.S. Cl. ............................. 377/16; 377/15; 377/25
(58) Field of Search .............................. 377/15, 16, 25

(56) References Cited

U.S. PATENT DOCUMENTS

| | | | |
|---|---|---|---|
| 4,727,559 A | * | 2/1988 | Yokoyama et al. ............ 377/16 |
| 6,088,421 A | * | 7/2000 | Rao et al. ...................... 377/44 |

OTHER PUBLICATIONS

"Intel Pentium 4 Processor on 0.13 Micron Process in the 478–pin Package Datasheet," *Intel*, pp. 67–72.

* cited by examiner

*Primary Examiner*—Margaret Wambach
(74) *Attorney, Agent, or Firm*—Brett A. Hertzberg; Merchant & Gould

(57) ABSTRACT

A method and apparatus are arranged to provide a multi-bit digital signal that represents a normalized percentage of time that a signal is active. The apparatus includes an N-bit counter that is periodically reset to an initialization condition, and a logic block that processes the output of the N-bit counter. The N-bit counter is arranged to evaluate a monitored signal for each cycle of a clock signal, and modify the count accordingly. The logic block is configured to periodically scan the output of the N-bit counter after the expiration of a sampling time interval. The sampling time interval is determined by a timing circuit such as a window counter that is operated from the clock signal. The logic block periodically evaluates the output of the N-bit counter and provides the normalized multi-bit digital signal.

20 Claims, 2 Drawing Sheets

SIGNAL ACTIVE PERCENTAGE MONITOR

FIELD OF THE INVENTION

The present invention is generally related to circuits that monitor a signal to determine the percentage of time that the signal is active. More particularly, the present invention is related to an apparatus and method for sensing a digital signal and providing a multi-bit digital output code that indicates the percentage of time that the digital signal is active over a sampling time interval or sampling window.

BACKGROUND OF THE INVENTION

Conventional central processor units (CPUs) such as microprocessors and microcontrollers are operated at internal frequencies that typically range anywhere from megahertz (MHz) to gigahertz (GHz) frequencies. As the internal frequencies are increased, the amount of heat that is generated within the CPU also increases. The internal heat levels associated with the CPU can potentially damage the electronics within the CPU. Signal monitoring is useful to monitor the thermal temperature associated with the CPU so that damage to the internal electronics of the CPU can be prevented.

Some conventional CPUs have an internal sensor that monitors the temperature of the CPU during operation. External signals, such as a processor hot signal (PROCHOT), are provided by the CPU to indicate when the internal temperature of the CPU has exceeded some predetermined threshold level. The CPU may also include internal circuitry to adjust the internal clock frequency (a process called throttling back or throttling). By lowering the clock frequency inside the CPU, the overall heat levels should begin to decrease over time. However, CPUs typically require an external device to dissipate the thermal energy and protect the CPU from damage.

CPU based systems typically dissipate heat through heat sinks. The heat sinks may be cooled by one or more fans. Noise levels associated with each fan can be high when each fan is rotating at a maximum speed level. It is often desirable to limit the rotational speeds associated with the fans to minimum acceptable levels for cooling so that noise levels are minimized.

A fan speed control unit can be used to adjust the speeds associated with the cooling fans. Each fan speed may be adjusted separately for optimal heat dissipation characteristics. The heat sink for the CPU can have a separate fan that has a speed that is adjusted based on the monitored temperature of the CPU. For example, the CPU fan speed can be increased when the internal temperature of the CPU increases, while the CPU fan speed can be decreased when the internal temperature of the CPU decreases.

DETAILED DESCRIPTION OF THE PREFERRED EMBODIMENT

Figure 1:
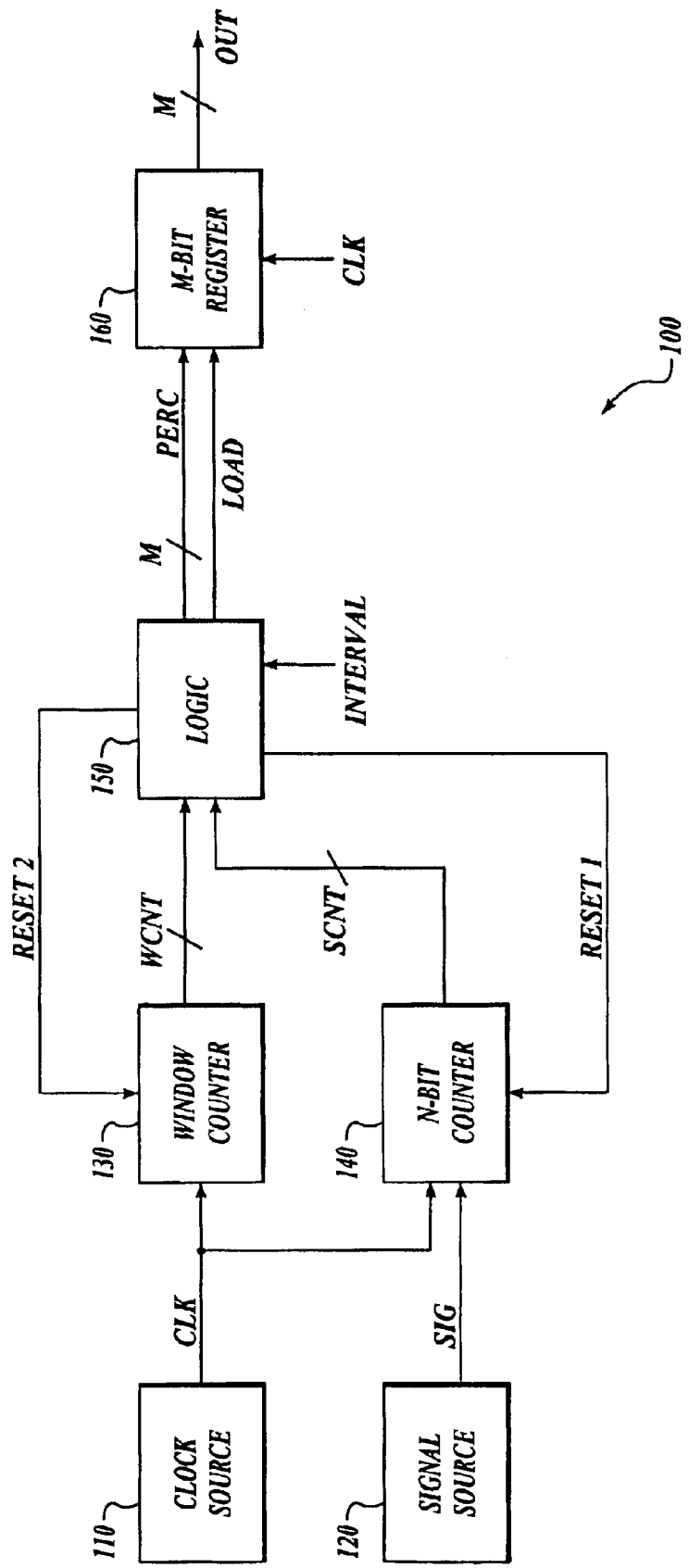
FIG. 1 is an illustrative system diagram of an embodiment of the present invention.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, logic, or data signal. Referring to the drawings, like numbers indicate like parts throughout the views.

The present invention is generally related to circuits that monitor a signal to determine the percentage of time that the signal is active. A digital circuit is arranged to monitor a signal over a sampling time interval, and reports a multi-bit digital signal that indicates the percentage of time that the signal was asserted over the sampling time interval.

Briefly stated, a method and apparatus are arranged to provide a multi-bit digital signal that represents a normalized percentage of time that a signal is active. The apparatus includes an N-bit counter that is periodically reset to an initialization condition, and a logic block that processes the output of the N-bit counter. The N-bit counter is arranged to evaluate a monitored signal for each cycle of a clock signal, and modify the count accordingly. The logic block is configured to periodically scan the output of the N-bit counter after the expiration of a sampling time interval. The sampling time interval is determined by a timing circuit such as a window counter that is operated from the clock signal. The logic block periodically evaluates the output of the N-bit counter and provides the normalized multi-bit digital signal.

In one example application, a PROCHOT signal is provided by a microprocessor to indicate that an over-temperature condition has occurred within the microprocessor. The internal circuitry associated with the microprocessor may throttle the internal clock while the PROCHOT signal is active, which degrades the overall performance of the microprocessor system. By monitoring the percentage of time that the PROCHOT signal is active, the percentage of time that the system is operated in a degraded mode can be determined. The percentage time information is useful for fan speed control, multiprocessing load balancing, as well as other diagnostic purposes. In an example multiprocessor system, the percentage time information can be used to offload some of the processing from one processor to another.

FIG. 1 is an illustrative system diagram (100) of an embodiment of the present invention. System diagram 100 includes a clock source (110), a signal source (120), a window counter (130), an N-bit counter (140), a logic block (150), and an M-bit register (160).

Clock source 110 provides a clock signal (CLK) to window counter 130 and N-bit counter 140. Signal source 120 provides a monitored signal SIG to N-bit counter 140. Window counter 130 receives clock signal CLK, a reset signal (RESET2), and produces a counter output (WCNT). N-bit counter 140 receives clock signal CLK, monitored signal SIG, a reset signal (RESET1), and produces another counter output (SCNT). Logic block 150 receives signals WCNT, SCNT, and INTERVAL, and provides output signals RESET 1, RESET2, PERC, and LOAD.

In operation, the N-bit counter (140) samples monitored signal SIG for each change in the clock signal (CLK). When monitored signal SIG is sampled as a logic 1 signal level, the output of N-bit counter 140 increases. The output of N-bit counter 140 does not increase when monitored signal SIG is sampled as a logic 0 signal level. Counter output signal SCNT indicates the total count associated with N-bit counter 140. N-bit counter 140 operates as a means for monitoring that is configured to determine when the monitored signal is active, and a means for providing that is arranged to provide an N-bit output from the means for monitoring.

Window counter 130 counts the number of cycles of clock signal (CLK) and provides counter output WCNT, which indicates the status of the sampling window, or sampling time interval. Window counter 130 is periodically reset to an initialization count level (e.g., all zeros). For each cycle of clock signal CLK, window counter 130 changes (e.g., increments) the counter output WNCT. After the sampling time interval has expired, count output WCNT will correspond to a terminal count level such as a maximum count level. The difference between the initialization count level and the terminal count level, and the frequency of clock signal CLK, will set a sampling time interval for N-bit counter 140. In one example, the sampling time interval corresponds to: $TCLK*2^{(FXD+ADJ)}$, where TCLK is the period of clock signal CLK, FXD is a fixed design parameter, and ADJ is an adjustable parameter. Thus, window counter 130 operates as an example of a means for timing that is arranged to indicate an end of the sampling time interval.

Logic block 150 is arranged to periodically evaluate counter output SCNT when counter output WCNT reaches the terminal count level (e.g., a maximum count level, or a zero count). Logic block 150 evaluates counter output SCNT to determine a percentage of time that monitored signal SIG was active over the span of the sampling time interval. Logic block 150 provides an M-bit output signal (PERC) that corresponds to the percentage of time that monitored signal SIG was active. The M-bit output signal is normalized by logic block 150 such that it is at full-scale (e.g., 11111111 or 0xFF for an 8-bit value) when the percentage corresponds to 100% and the M-bit output signal is zero when the percentage corresponds to 0%. Since the M-bit output signal is fully normalized, no additional electronics and/or processing is necessary to provide a normalized percentage. Thus, logic block 150 operates as an example of a means for sampling, a means for evaluating, and a means for normalizing. The means for sampling is arranged to sample the N-bit counter output at the end of the sampling time interval. The means for evaluating is arranged to evaluate the sampled N-bit counter output. The means for normalizing is arranged to normalize the sampled N-bit counter output to provide an M-bit output signal that corresponds to a normalized percentage of time that the monitored signal (e.g., SIG) is active.

Window counter 130 may be implemented in a number of ways including, but not limited to, an increasing counter, a decreasing counter, a "one-shot" circuit, a ring counter, a ripple counter, and a shift register. The window counter (130) is periodically reset to an initialization count level that varies based on the counter topology. In one example, window counter 130 is arranged to count down to zero from a maximum count level. In another example, window counter 130 is arranged to count up to the maximum count level from zero. In still another example, window counter 130 is arranged to count up to the maximum count from a preloaded count that is non-zero. Similar configurations are available for N-bit counter 140.

Each of the counters (130, 140) should return to a reset condition (i.e., the initialization count level) after the evaluation by logic block 150. Each reset condition can be periodically initiated by logic block 150 (e.g., via reset signal RESET1 and/or reset signal RESET2), or by an internal mechanism that is initiated by the particular counter. In one example, window counter 130 increases its count for each subsequent cycle of clock signal CLK, and window counter 130 is reset to a zero count via reset signal RESET2. In another example, window counter 130 increases its count for each subsequent cycle of clock signal CLK, and window counter 130 resets itself to zero after the terminal count is reached. In still another example, window counter 130 decreases its count for each subsequent cycle of clock signal CLK, and window counter 130 is reset to the maximum count level after the count of zero is attained.

M-bit register 160 is arranged to load normalized result signal PERC in response to clock signal CLK when signal LOAD is active. The LOAD signal is active after the terminal count of window counter 130 has been reached. RESET1 and RESET2 may be a single reset signal, or separate signals. However, the output of N-bit counter 140 should be processed and/or stored prior to resetting. In one example embodiment, logic block 150 is arranged such that the rising edge of clock signal CLK can be used to load M-bit register 160 (e.g., by activating LOAD) while the trailing edge of clock signal CLK can be used to reset counters 130 and 140 (e.g., via RESET1 and RESET2).

In one example embodiment of the present invention, the "M" most significant bits (MSBs) of N-bit counter (140) are simply latched into M-bit register 160 after the terminal count level is reached for window counter 130. The MSBs of N-bit counter 140 correspond to a normalized result for the percentage of time that monitored signal SIG is active over the integration time (sampling window) of the system. For example, when M=8, an 8-bit result (n) is latched into register 160 after the terminal count level is reached such that the normalized result corresponds to n/256.

Figure 2:
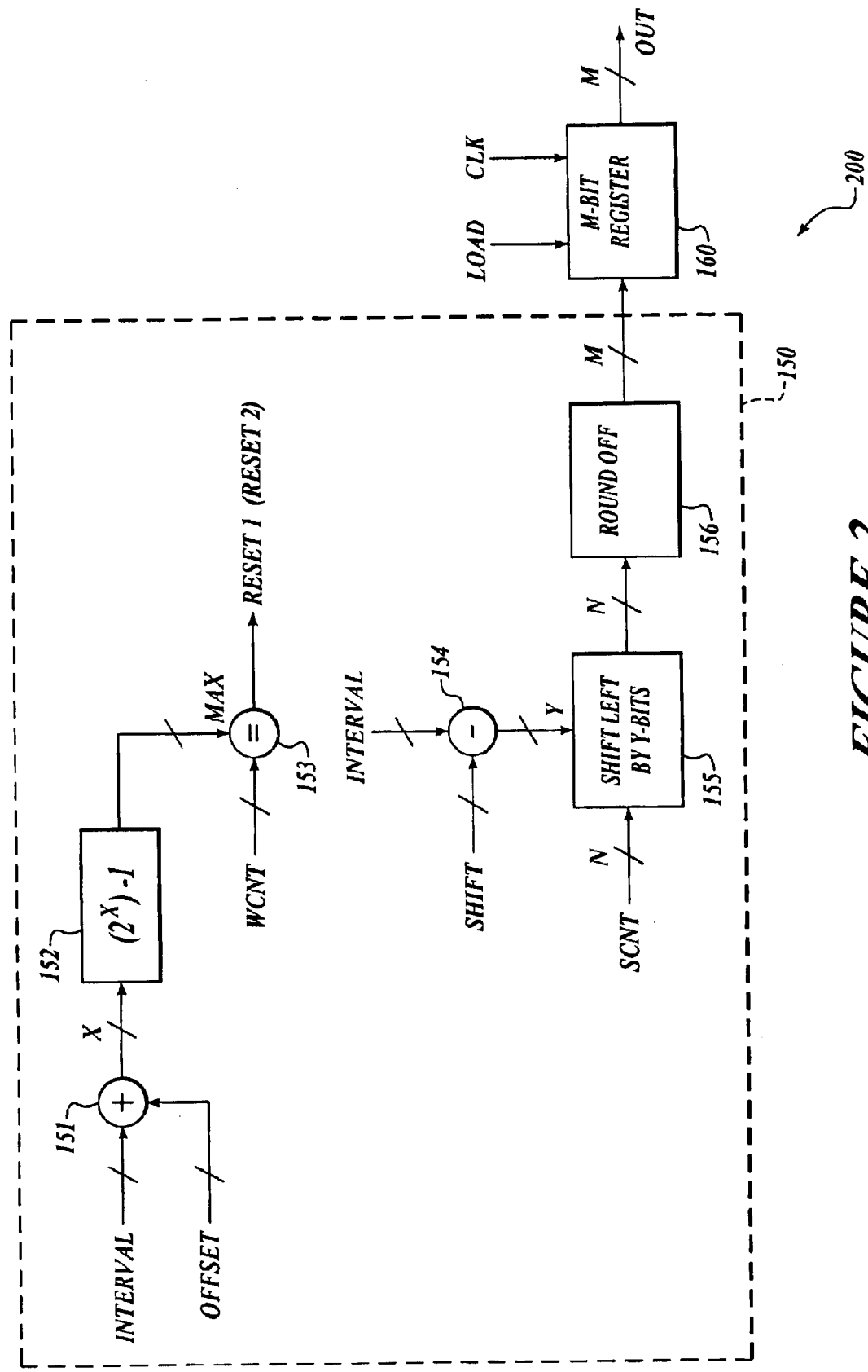
FIG. 2 is an illustrative block diagram for a logic block of an embodiment of the present invention.

FIG. 2 is an illustrative block diagram for a logic block of an example embodiment of the present invention. Logic block 150 includes functional blocks for an adder (151), a modified shifter (152), a multi-bit comparator (153), a subtractor (154), a shifter (155), and a round off (156).

Adder block 151 is configured to provide result "x", which corresponds to the sum of INTERVAL and OFFSET. Modified shifter block 152 is configured to provide a counter maximum (MAX) that corresponds to $(2^x)-1$. The counter maximum is a number of clocks that span the integration time interval (the sampling window) for window counter 130 (see FIG. 1). Multi-bit comparator block 153 is configured to compare signal WCNT (the window counter output) to MAX, and provide reset signals (e.g., RESET1, and RESET2) to the counters (e.g., window counter 130, and N-bit counter 140) when WCNT corresponds to MAX. Moreover, the output of multi-bit comparator block 153 may also be used as the LOAD signal for M-bit register 160.

Subtractor block 154 is configured to provide result "y", which corresponds to the difference between INTERVAL and SHIFT. Shifter block 155 is configured to provide an N-bit output signal in response to signals SCNT (the output of N-bit counter 140) by shifting SCNT left by y-bits. Round-off block 156 is an optional block that is arranged to receive the output from shifter 155 and either rounding the result (either round-up or down), or truncating off the lower-bit portions. The output of round-off block 156 is an M-bit output signal that is provided to the M-bit register as signal PERC (see FIG. 1).

The INTERVAL signal is a binary value that may be provided to the system from some external source such as a register, a lookup table, hard-wired, or some other memory storage means. INTERVAL may be associated with an adjustable parameter that determines the total time associated with the sampling time interval (or sampling window size). The OFFSET signal is a binary value that may also be provided by an external source such as a register, a look-up table, hard-wired, or some other memory storage means. OFFSET may be associated with an offset normalization value. As described earlier, the sampling time interval may be defined by the following mathematical relationship: $TCLK*2^{(FXD+ADJ)}$, where TCLK is the period of clock signal CLK, FXD is a fixed design parameter, and ADJ is an adjustable parameter. The output of modified shifter block 152 determines the maximum number of clock cycles (MAX) for window counter 130 to reach a terminal count level, where $MAX=[2^{(INTERVAL+OFFSET)}-]$. The sampling time interval for N-bit counter 140 similarly corresponds to: $TCLK*MAX=TCLK*[2^{(INTERVAL+OFFSET)}]$.

The SHIFT signal is a binary value that may be provided to the system from some external source such as a register, a lookup table, hard-wired, or some other memory storage means. SHIFT may be a parameter that is associated with the maximum number of shifts required by shifter block 155 to normalize the output of the N-bit counter. The normalization that is required varies based on the sampling time interval, as determined by the sum of INTERVAL and OFFSET as previously described-above. The output of shifter block 155 has a normalized range of values from 0 to $\{[2^{(INTERVAL+OFFSET)}-1]*2^{(SHIFT-INTERVAL)}\}=\{2^{(SHIFT+OFFSET)}-2^{(SHIFT-INTERVAL)}\}$. As shown by the above mathematical relationship, the total number of bits of resolution that is required by the counters corresponds to the sum of SHIFT and OFFSET. The output from shifter block 155 is arranged to provide "N" bits to round-off block 156. Round-off block 156 is arranged to provide "M" MSBs to M-bit register 160 such that the value stored in M-bit register 160 corresponds to a normalized value for the percentage of time that SIG is active over the sampling time interval.

In one example, one or more of the parameters (SHIFT, INTERVAL, and OFFSET) can be variable or fixed quantities. Adder block 151 and modified shifter block 153 can be eliminated when INTERVAL and OFFSET are fixed quantities. The round-off block may optionally be eliminated such that "M" MSBs from shifter block 156 are coupled to M-bit register 160. Subtractor block 154 can be eliminated when SHIFT and INTERVAL are fixed quantities such that shifter block 155 can be optimized. Other implementations for logic block 150 are possible while applying the same methods and procedures without departing from the spirit of the present invention.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for evaluating a monitored signal, comprising:
    an N-bit counter that is coupled to a clock signal and the monitored signal, wherein the N-bit counter is configured to evaluate the monitored signal for each cycle of the clock signal such that an N-bit output of the N-bit counter is associated with the monitored signal;
    a window counter that is coupled to the clock signal, wherein the window counter is configured to provide a window counter output; and
    a logic block that is coupled to the N-bit counter output and the window counter output, wherein the logic block is arranged to evaluate the N-bit counter output when the window counter output reaches a terminal count level that is associated with a sampling time interval, and wherein the logic block is further arranged to provide an M-bit normalized output that corresponds to a percentage of time that the monitored signal is active over the sampling time interval.

2. The apparatus as in claim 1, wherein at least one of the N-bit counter and the window counter is further configured to reset to an initialization count level after the logic block evaluates the N-bit counter output.

3. The apparatus as in claim 1, wherein the logic block is arranged to reset at least one of the N-bit counter and the window counter after the logic block evaluates the N-bit counter output.

4. The apparatus as in claim 1, wherein the logic block is arranged to evaluate M of the most significant bits associated with the N-bit counter output when the window counter output reaches a terminal count level.

5. The apparatus as in claim 1, wherein the logic block is arranged to provide a reset signal after the terminal count level is reached, and wherein the window counter is arranged to initialize the window counter output to an initialization count level in response to the reset signal.

6. The apparatus as in claim 5, wherein the initialization count level corresponds to at least one of zero, a maximum count level, and a preloaded count level.

7. The apparatus as in claim 1, wherein the window counter is arranged to reset to an initialization count level after the terminal count level is reached.

8. The apparatus as in claim 7, wherein the initialization count level corresponds to at least one of zero, a maximum count level, and a preloaded count level.

9. The apparatus as in claim 1, wherein the window counter is arranged to count from an initialization count level to the terminal count level over the span of the sampling time interval.

10. The apparatus as in claim 1, the logic block further comprising a shifter block that is configured to receive the N-bit counter output as an input, wherein the shifter block is arranged to shift the input to the left by a number of bits such that M of the most significant bits from the shifter block indicate a normalized percentage of time that the monitored signal is active over the sampling time interval.

11. The apparatus as in claim 10, the logic block further comprising an M-bit register that is arranged to store M of the most significant bits from the shifter block.

12. The apparatus as in claim 10, the logic block further comprising a round-off block that is arranged to round M of the most significant bits from the shifter block to a nearest value.

13. The apparatus as in claim 12, the logic block further comprising an M-bit register that is arranged to store M of the most significant bits from the round-off block.

14. The apparatus as in claim 10, the logic block further comprising a multi-bit comparator block that is arranged to compare the window counter output to a maximum count level that is determined by $[2^{(INTERVAL+OFFSET)}-1]$, wherein INTERVAL is associated with an adjustable parameter that determines the total time associated with the sampling time interval, and wherein OFFSET is associated with an offset normalization value that determines the total time associated with the sampling time interval.

15. The apparatus as in claim 10, the logic block further comprising a multi-bit comparator block, an adder block, and a modified shifter block, wherein the adder block is arranged to provide a sum that corresponds to (INTERVAL+ OFFSET), wherein the modified shifter block is arranged to provide a maximum count level that corresponds to $\{2^{(INTERVAL+OFFS)}-1\}$, wherein the multi-bit comparator is arranged to compare the window counter output to the maximum count level, wherein INTERVAL is associated with an adjustable parameter that determines the total time associated with the sampling time interval, and wherein OFFSET is associated with an offset normalization value that determines the total time associated with the sampling time interval.

16. The apparatus as in claim 10, the logic block further comprising a subtractor block that is arranged to provide a difference between INTERVAL and SHIFT, wherein the difference is coupled to the shifter block such that the shifter block shifts the input to the left by the number of bits corresponding to SHIFT−INTERVAL, wherein SHIFT corresponds to a maximum number of shifts for the shifter block and INTERVAL is associated with an adjustable parameter that determines the total time associated with the sampling time interval.

17. The apparatus as in claim 1, wherein the logic block is further arranged such that the M-bit normalized output is in a range from 0 to $\{2^{(SHIFT+OFFSET)}-2^{(SHIFT-INTERVAL)}\}$.

18. An apparatus for evaluating a monitored signal, comprising:
  a means for timing that is arranged to indicate an end of the sampling time interval;
  a means for monitoring that is configured to determine when the monitored signal is active, and a means for providing that is arranged to provide an N-bit output from the means for determining;
  a means for sampling that is arranged to sample the N-bit output when the end of the sampling time interval is indicated;
  a means for evaluating that is arranged to evaluate the sampled N-bit output; and
  a means for normalizing that is arranged to normalize the sampled N-bit output to provide an M-bit output signal that corresponds to a normalized percentage of time that the monitored signal is active.

19. The apparatus as in claim 18, wherein the means for normalizing is further arranged such that the M-bit output signal is in a range from 0 to $\{2^{(SHIFT+OFSET)}-2^{(SHIFT-INTERVAL)}\}$.

20. A method for evaluating a monitored signal, comprising:
  monitoring the monitored signal over a sampling time interval;
  counting a number of clock cycles that the monitored signal is active over the sampling time interval to provide an N-bit counter output;
  sampling the N-bit counter output at the end of the sampling time interval;
  evaluating the sampled N-bit counter output;
  analyzing a number (M) of most significant bits (MSBs) associated with the sampled N-bit counter output; and
  normalizing the analyzed most significant bits to provide an M-bit output signal that corresponds to a normalized percentage of time that the monitored signal is active.

* * * * *